United States Patent
Post

[15] 3,657,994

[45] Apr. 25, 1972

[54] COMBINATION CONTAINER AND DISPENSER

[72] Inventor: Norman W. Post, P.O. Box 230, Fire Road, Pleasantville, N.J. 08232

[22] Filed: May 10, 1971

[21] Appl. No.: 141,715

[52] U.S. Cl. ............................................................99/323
[51] Int. Cl. ...............................................A47j 31/00
[58] Field of Search ..........................99/323, 293, 298, 77.1

[56] References Cited

UNITED STATES PATENTS

| 256,231 | 4/1882 | Mackey | 99/293 |
| 1,168,092 | 1/1916 | Mauntel | 99/323 |
| 2,133,166 | 10/1938 | Fritsche | 99/323 |
| 3,102,465 | 9/1963 | Montesano | 99/323 |

Primary Examiner—Robert W. Jenkins
Attorney—Howson & Howson

[57] ABSTRACT

Apparatus is provided for containing beverages such as coffee, tea or chocolate in granulated form and for dispensing the same into a water-filled receptacle. The apparatus comprises a hollow cylindrical container having a removable cap and having a series of apertures in its sidewall which are adapted to register with a like series of ports in a closure member when the container is rotated relative thereto. the closure member has a hook portion for engaging over the rim of the receptacle. Stops are provided on the container and the closure member to limit relative rotation of the container relative to the closure from a position covering the apertures to a position in which the apertures and ports register with one another for dispensing the beverage.

7 Claims, 5 Drawing Figures

PATENTED APR 25 1972 3,657,994

INVENTOR:
NORMAN W. POST
BY Howson & Howson
ATTYS.

COMBINATION CONTAINER AND DISPENSER

The present invention relates to portable containers which are adapted to contain granulated beverages and to dispense the same into liquid-containing receptacles.

Apparatus is known for dispensing granulated beverages such as coffee, tea or the like into a heated liquid, and examples of such apparatus are disclosed in U.S. Pats. No. 1,387,128; No. 2,133,166; and No. 256,231. Although the apparatus disclosed in each of these patents may operate satisfactorily as a dispenser, each must be filled prior to use with a granulated beverage from a separate sealed container. Because the aforementioned dispensers are incapable of containing granulated beverages in a manner which preserves their freshness, the dispensers are not readily suited for outdoorsmen who may wish to consume freshly brewed beverages but who do not wish to carry the additional storage paraphenalia.

With the foregoing in mind, it is the primary object of the present invention to provide novel apparatus which is capable of both containing and dispensing granulated beverages such as coffee, tea, chocolate or the like.

As another object, the present invention provides a combination container and dispenser which is of simple construction and which is economical to manufacture.

More specifically, the present invention provides combination container and dispenser apparatus which is particularly useful in brewing beverages. The apparatus comprises a hollow cylindrical container having a closed bottom, an open top and a continuous sidewall with a series of apertures therein. A removable cap is provided to close the top of the container, and the apertures are normally covered by means of a closure which surrounds the sidewall but which has a series of ports located so as to register with the apertures when the container is rotated relative to the closure. A hook is provided on the closure means to engage over the rim of a drinking vessel for disposing the apertures and hence the material in the container below the fluid level in the vessel to brew the beverage.

These and other objects, features and advantages of the present invention should become apparent from the following description when taken in conjunction with the accompanying drawing in which.

Figure 1:
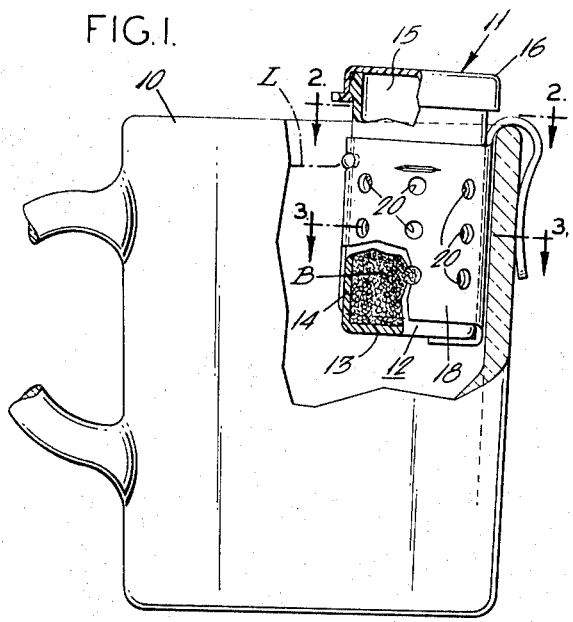
FIG. 1 is a side elevational view of a cup broken away to expose containing and dispensing apparatus embodying the present invention.

Referring now to the drawing, there is illustrated in FIG. 1 a drinking vessel or cup 10 in which is mounted the combination container and dispenser apparatus 11 of the present invention. As may be seen therein, the apparatus comprises a hollow cylindrical container 12 which, in the present instance, has a flat bottom 13 and a continuous upstanding sidewall 14 with an opening 15 at the top of the sidewall 14. A cap 16 frictionally engages the upper end of the sidewall 14 to close the opening 15. Preferably, both the container 12 and the cap 16 are of plastic construction.

Figure 3:
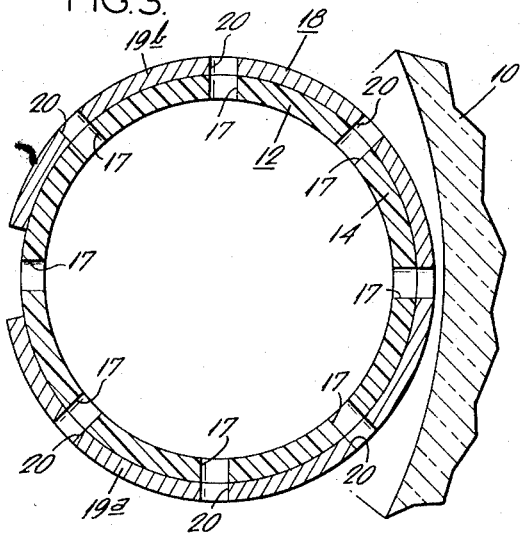
FIG. 3 is an enlarged sectional view taken along line 3—3 of FIG. 1 to illustrate apertures in the container in registry with ports in the container-closure for dispensing a beverage.

In accordance with the present invention, closure means cooperates with the container to store a granulated beverage B such as coffee, tea, chocolate or the like in a fresh manner and to dispense the beverage B directly from the container 12 and into water charged to the level L in the cup 10. To this end, a plurality apertures 17,17 (FIGS. 1 and 3) are provided in the sidewall 14 of the container 12, and closure means 18 is provided for normally covering the apertures 17,17 to prevent leakage of the granulated beverage B from the container 12 or to prevent air from entering the container 12, or both. In the illustrated embodiment, the closure 18 is of one-piece metal construction, having an upstanding cylindrical wall with a plurality or ports 20,20 therein. The closure surrounds and intimately engages a major portion of the periphery of the sidewall 14 of the container 12, having one leg 19a and another leg 19b extending clockwise and counterclockwise respectively from a location adjacent the rim of the cup 10. In the present instance, the closure 18 is formed of aluminum having sufficient elasticity to cause the legs 19a and 19b frictionally to engage the sidewall 14 of the container 12 for preventing unintentional relative rotation and for providing a leak-proof joint.

Figure 4:
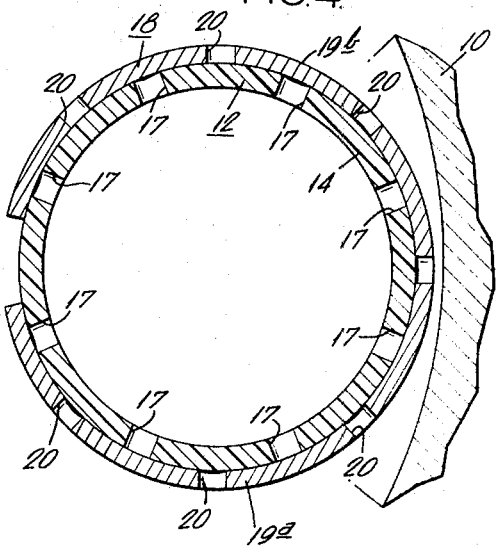
FIG. 4 is a view similar to FIG. 3 but illustrating the position of the apertures with respect to the ports when the apparatus is containing the granulated beverage and before the container is rotated relative to the closure means for dispensing the beverage.
Figure 5:
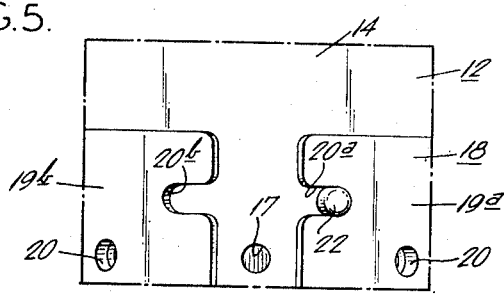
FIG. 5 is a fragmentary view taken along line 5—5 of FIG. 2.

The container 12 is rotated relative to the closure 18 to expose the beverage B therein to the water in the cup 10. For this purpose, the spacing of the apertures 17,17 in the sidewall 14 corresponds to the spacing of the ports 20,20 in the closure 18. In the present instance, a series of eight apertures 17,17 are provided in the sidewall 14 and a series of seven ports 20,20 are provided in the closure 18. Three series are provided with each series being located in a plane normal to the axis of the container. Thus, the beverage B is exposed to the water when the container 12 is rotated through an angle of 45° from the fully closed or storage position illustrated in FIG. 4 to the fully open or dispensing position illustrated in FIG. 3. It is to be noted that the container 12 need not be rotated into the full-open position illustrated in FIG. 3 to operate satisfactorily; however, at less than the full-open position, the dispersion rate is correspondingly reduced. Moreover, it is to be noted that the size and number of the apertures 12 and the ports 20 may vary, depending on the size of the granules of the beverage B to be discharged, with smaller sizes being preferred for finely ground materials and larger sizes being preferred for less finely ground materials.

Figure 2:
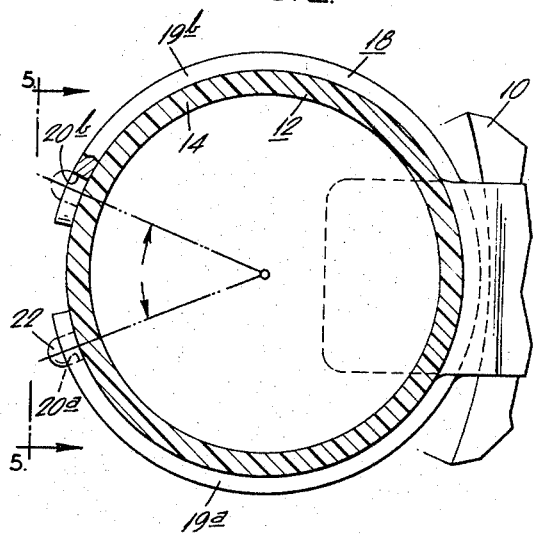
FIG. 2 is an enlarged sectional view taken along line 2—2 of FIG. 1.

In order to limit the relative rotation between the container 12 and the closure 18 to prevent the user from rotating the container 12 beyond the full-open position, stop means is provided on the container 12 and the closure 18. As may be seen in FIG. 2, the stop means comprises a pair of recesses 20a and 20b in the legs 19a and 19b, respectively of the closure 18 and a protrusion 22 on the sidewall 14 for engaging in the recesses. The spacing between the recesses 20a and 20b corresponds substantially to the spacing of the apertures 17 and the ports 20 so that when the container 12 is rotated to dispose the protrusion 22 in its full line position (FIG. 2), the ports 17 and apertures 20 automatically register with one another in their full-open position. As an additional advantage, engagement of the protrusion 22 in the recess 20b prevents unintentional upward displacement of the container relative to the closure, thereby protecting the contents against inadvertent discharge in shipment or the like.

In use, the container and dispenser apparatus 11 is charged with the granulated beverage B and is shipped to the consumer. To brew the beverage, the consumer merely rotates the container 12 with respect to the closure member 18 to expose the beverage B, and the member 18 is hooked onto the rim of the cup 10. Hot water is then charged into the cup 10, and after a short time, the beverage is brewed. Thereafter, the apparatus 11 is removed from the cup and discarded, or if desired, the apparatus may be refilled for subsequent use.

In view of the foregoing, it should be apparent that there has been provided novel container-dispenser apparatus which is particularly suited for brewing beverages. Moreover, the apparatus is also useful in situations where it is desired to provide a container having adjustable vent means, for instance, in situations where a fisherman may wish to carry live bait.

While a preferred embodiment of the present invention has been described in detail, various modifications, alterations and changes may be made without departing from the spirit and scope of the present invention as defined in the appended claims.

I claim:

1. Apparatus for containing and dispensing materials, comprising:

a hollow container having a bottom, a sidewall with a series of apertures therein, and an opening at one end for receiving materials into said container, a removable cap engaging said container to cover said open end, closure means surrounding at least a major portion of said sidewall and having a series of ports therein, said closure means frictionally engaging said sidewall and being displaceable relative to said container from one position covering said apertures into another position wherein said ports register with said apertures, and means carried by said closure means to removably mount said closure means to a support member, whereby the closure means and cap cooperate with the container to provide a leakproof container when the closure is in one position and the apertures are covered and to provide a dispensing container when the closure is in another position and the ports register with the apertures.

2. Apparatus according to claim 1 wherein said sidewall and closure means each have a cylindrical transverse cross-section with each series of said ports and apertures being disposed in a common transverse plane, said container being rotatable relative to said closure means thereby to cause said apertures to register with said ports.

3. Apparatus according to claim 2 wherein said apertures are located in equally spaced relation in the periphery of said sidewall and said ports are similarly located in said closure means, said ports and apertures being disposed in at least two axially spaced series.

4. Apparatus according to claim 1 including stop means carried on said container and closure means and cooperable to permit limited displacement of said container relative to said closure from said one position covering said apertures and into said other position affording registry of said ports and apertures.

5. Apparatus according to claim 4 wherein said mounting means includes a downturned hook integral with said closure means, and wherein said stop means includes a pair of spaced recesses in said closure means remote from said hook and a protrusion on said container for engaging in said recesses, said recesses being spaced from one another a distance corresponding substantially to the spacing of said ports and apertures in the direction of movement of said container relative to said closure.

6. Apparatus according to claim 1 wherein said container is of plastic material and said closure means is of metal.

7. Apparatus according to claim 1 wherein said mounting means is hook-shaped to engage over the rim of an open receptacle for disposing the ports and apertures below said rim, and including a finger integral with said closure means and extending radially inward from a location adjacent said mounting means to underlie the bottom of said container for limiting the axial displacement of said container relative to said closure means.

* * * * *